(12) United States Patent
Kucherov et al.

(10) Patent No.: US 10,929,239 B2
(45) Date of Patent: Feb. 23, 2021

(54) STORAGE SYSTEM WITH SNAPSHOT GROUP MERGE FUNCTIONALITY

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 16/516,539

(22) Filed: Jul. 19, 2019

(65) Prior Publication Data

US 2021/0019229 A1    Jan. 21, 2021

(51) Int. Cl.
*G06F 11/14* (2006.01)
*G06F 3/06* (2006.01)
*G06F 16/901* (2019.01)
*G06K 9/62* (2006.01)
*G06F 9/455* (2018.01)

(52) U.S. Cl.
CPC ........ *G06F 11/1448* (2013.01); *G06F 3/0604* (2013.01); *G06F 3/065* (2013.01); *G06F 3/067* (2013.01); *G06F 3/0608* (2013.01); *G06F 3/0658* (2013.01); *G06F 3/0665* (2013.01); *G06F 11/1469* (2013.01);
(Continued)

(58) Field of Classification Search
CPC ...... G06F 3/0604; G06F 3/0608; G06F 3/065; G06F 3/0658; G06F 3/0665; G06F 3/067; G06F 9/45558; G06F 11/1448; G06F 11/1469; G06F 16/9027

USPC ......................................................... 711/162
See application file for complete search history.

(56) References Cited

U.S. PATENT DOCUMENTS 7,444,464 B2   10/2008   Urmston et al.
8,095,726 B1   1/2012   O'Connell et al.
(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Reginald G Bragdon
*Assistant Examiner* — Aaron D Ho
(74) *Attorney, Agent, or Firm* — Ryan, Mason & Lewis, LLP

(57) ABSTRACT

An apparatus includes at least one processing device comprising a processor coupled to a memory, with the processing device being configured to identify a first storage volume of a first snapshot group of a storage system, to identify a second storage volume that is not part of the first snapshot group of the storage system but contains at least a threshold amount of matching data relative to the first storage volume, and to merge the second storage volume into the first snapshot group. The processing device illustratively comprises a storage controller of the storage system. The storage system may be implemented as a clustered storage system comprising a plurality of storage nodes. Each storage node may comprise a set of processing modules of a distributed storage controller of the clustered storage system.

20 Claims, 9 Drawing Sheets

(52) U.S. Cl.
CPC ....... *G06F 16/9027* (2019.01); *G06K 9/6201* (2013.01); *G06F 9/45558* (2013.01)

(56) References Cited

U.S. PATENT DOCUMENTS

| | | | |
|---|---|---|---|
| 8,214,612 | B1 | 7/2012 | Natanzon |
| 9,075,810 | B2* | 7/2015 | Banerjee ................. G06F 16/11 |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0007388 | A1* | 1/2013 | Kito ....................... G06F 3/0689 711/162 |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1* | 7/2016 | Klarakis ............... G06F 3/0665 709/217 |
| 2016/0224259 | A1 | 8/2016 | Ahrens et al. |
| 2016/0253109 | A1* | 9/2016 | Litke ..................... G06F 3/0665 711/114 |
| 2017/0192857 | A1 | 7/2017 | Meiri et al. |
| 2019/0188019 | A1* | 6/2019 | Hadas .................. G06F 9/45558 |
| 2020/0012619 | A1* | 1/2020 | Gupta ................... G06F 16/113 |
| 2020/0174692 | A1* | 6/2020 | Dave ..................... G06F 3/0652 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

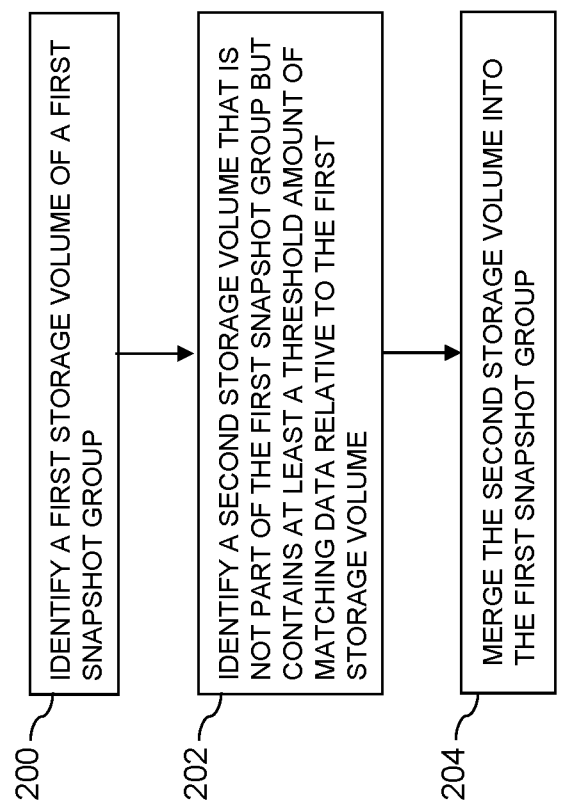

STORAGE SYSTEM WITH SNAPSHOT GROUP MERGE FUNCTIONALITY

FIELD

The field relates generally to information processing systems, and more particularly to storage in information processing systems.

BACKGROUND

It is common for a storage system to maintain multiple snapshots for each of multiple storage volumes of the storage system. Each such snapshot illustratively represents a particular point-in-time (PIT) copy of its corresponding storage volume. Groups of related storage volume snapshots, also referred to herein as snapshot groups or "snapgroups," each illustratively capturing changes to a particular corresponding storage volume over time, are also commonly maintained by the storage system. However, multiple unrelated storage volumes can in some cases include very similar data, but nonetheless have entirely separate snapgroups. This is inefficient as it leads to duplication of metadata operations and other excessive usage of storage resources for maintenance of the separate snapgroups.

SUMMARY

Illustrative embodiments provide storage systems that are configured to implement snapshot group merge functionality for storage volumes. For example, in some embodiments, techniques are provided for merging multiple otherwise unrelated storage volumes into a single snapgroup in a manner that avoids duplication of metadata operations and conserves storage resources.

These embodiments illustratively include a clustered implementation of a content addressable storage system having a distributed storage controller. Similar advantages can be provided in other types of storage systems.

In one embodiment, an apparatus includes at least one processing device comprising a processor coupled to a memory, with the processing device being configured to identify a first storage volume of a first snapshot group of a storage system, to identify a second storage volume that is not part of the first snapshot group of the storage system but contains at least a threshold amount of matching data relative to the first storage volume, and to merge the second storage volume into the first snapshot group. The processing device illustratively comprises a storage controller of the storage system.

In some embodiments, identifying a second storage volume that is not part of the first snapshot group of the storage system but contains at least a threshold amount of matching data relative to the first storage volume comprises comparing a portion of each of a plurality of storage volumes to a corresponding portion of the first storage volume to determine amounts of matching data relative to the first storage volume, and identifying the second storage volume from among the plurality of storage volumes based at least in part on results of the comparing.

For example, comparing a portion of each of a plurality of storage volumes to a corresponding portion of the first storage volume to determine amounts of matching data relative to the first storage volume may comprise comparing content-based signatures of respective designated data pages of each of the plurality of storage volumes to content-based signatures of respective designated data pages of the first storage volume. The content-based signatures illustratively comprise at least one of respective hash handles of the designated data pages and respective hash digests of the designated data pages. The portions of the storage volumes may comprise respective slices of the storage volumes. Also, the amounts of matching data for respective ones of the plurality of storage volumes are determined as numbers of data pages having content-based signatures that match content-based signatures of the corresponding data pages of the first storage volume.

In some embodiments, comparing a portion of each of a plurality of storage volumes to a corresponding portion of the first storage volume to determine amounts of matching data relative to the first storage volume comprises performing a first level comparison using a relatively small sample of data pages of the plurality of storage volumes, and for any of the plurality of storage volumes found to satisfy the first level comparison, performing a second level comparison using a relatively large sample of data pages of those storage volumes.

In some embodiments, merging the second storage volume into the first snapshot group comprises generating respective first and second snapshots of the respective first and second storage volumes. For each of a plurality of data pages of the second snapshot, a content-based signature of that data page is compared to a content-based signature of a corresponding data page of the first snapshot, and for any mismatched data page, the data page of the first snapshot is modified to match the data page of the second snapshot. The second storage volume and the first snapshot are then merged such that the second storage volume corresponds to a snapshot of the first storage volume in the first snapshot group. Also, the second snapshot and a previous root node of the second storage volume are deleted.

In some embodiments, the storage system comprises a plurality of storage nodes, with each of the storage nodes comprising a set of processing modules configured to communicate with corresponding sets of processing modules on other ones of the storage nodes. The sets of processing modules of the storage nodes of the storage system collectively comprise at least a portion of the storage controller of the storage system. Each of the sets of processing modules illustratively comprises one or more control modules, one or more routing modules and one or more data modules, and at least one of the sets of processing modules comprises a management module. Numerous other clustered and non-clustered storage system arrangements are possible in other embodiments.

These and other illustrative embodiments include, without limitation, apparatus, systems, methods and processor-readable storage media.

BRIEF DESCRIPTION OF THE DRAWINGS

FIGS. 2A, 2B and 2C are flow diagrams of a process for merging multiple storage volumes into a single snapgroup in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
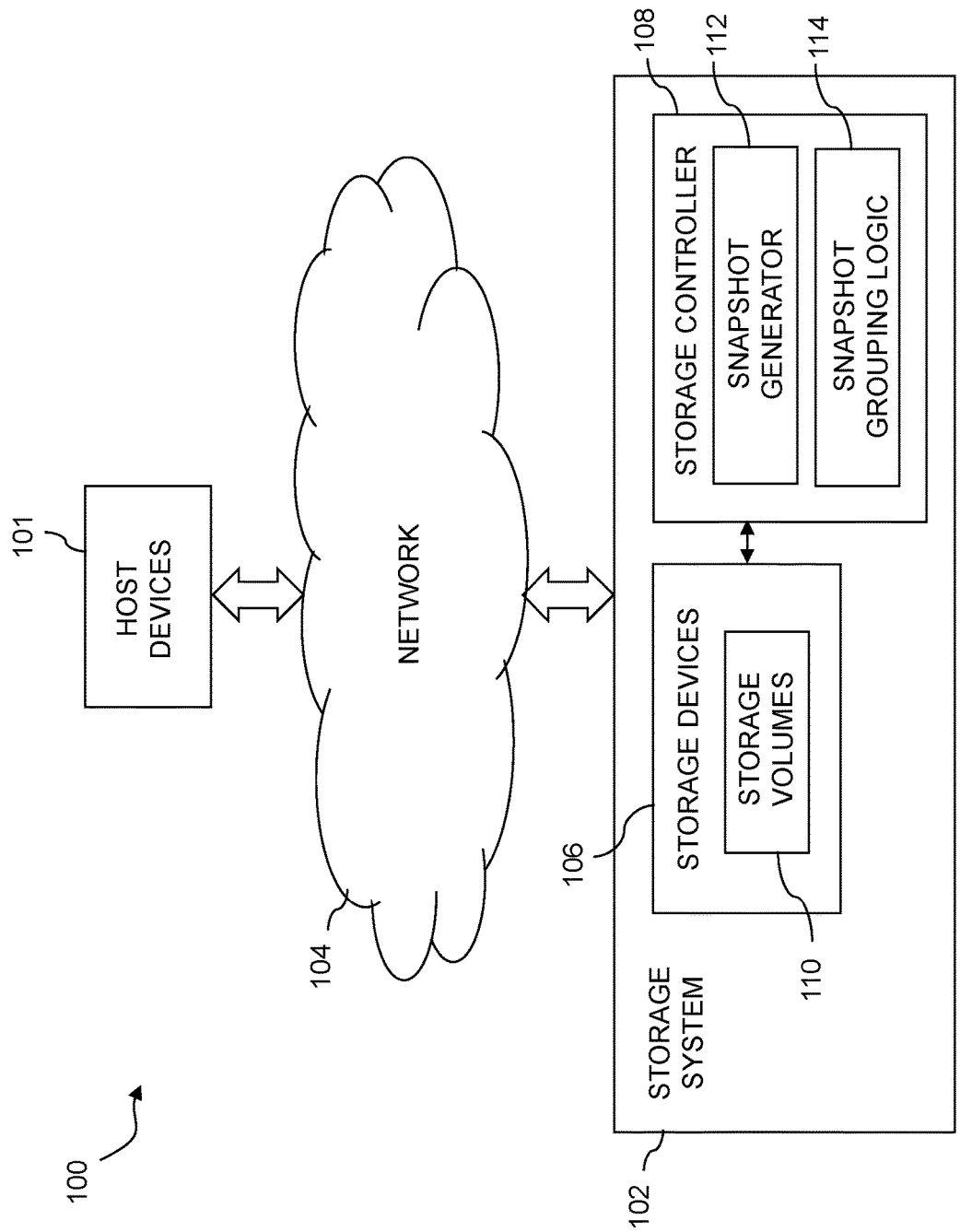
FIG. 1 is a block diagram of an information processing system comprising a storage system having snapgroup merge functionality in an illustrative embodiment.

FIG. 1 shows an information processing system 100 configured in accordance with an illustrative embodiment. The information processing system 100 comprises a plurality of host devices 101 and a storage system 102, which are configured to communicate with one another over a network 104. The storage system 102 is more particularly configured in this embodiment to implement snapshot group merge functionality for storage volumes. For example, the storage system 102 is illustratively configured to merge multiple otherwise unrelated storage volumes into a single snapgroup in a manner that avoids duplication of metadata operations and conserves storage resources. Such functionality in some embodiments can also involve one or more of the host devices 101.

The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (TO) operations that are processed by the storage system 102. The term "input-output" as used herein refers to at least one of input and output. For example, IO operations generated by applications executing on the host devices 101 may comprise write requests and/or read requests directed to stored data of the storage system 102. These and other types of IO operations are also generally referred to herein as IO requests.

The storage system 102 illustratively comprises one or more processing devices of at least one processing platform. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms.

The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 and an associated storage controller 108. The storage devices 106 store storage volumes 110. The storage volumes 110 illustratively comprise respective logical units (LUNs) or other types of logical storage volumes.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 102 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 102 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, communications between the host devices 101 and the storage system 102 comprise Small Computer System Interface (SCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

The storage controller 108 of storage system 102 in the FIG. 1 embodiment includes snapshot generator 112 and snapshot grouping logic 114.

The storage controller 108 may include additional modules and other components typically found in conventional implementations of a storage controller of a storage system, although such additional modules and other components are omitted from the figure for clarity and simplicity of illustration. For example, the storage controller 108 in illustrative embodiments can include a signature generator for generating content-based signatures of respective data pages, and a replication engine for replicating one or more of the storage volumes 110 to another storage system.

The snapshot generator 112 generates snapshots of the storage volumes 110 over time. Each such snapshot illustratively represents a particular PIT copy of its corresponding storage volume.

The snapshot grouping logic 114 maintains groups of related storage volume snapshots, also referred to herein as snapshot groups or "snapgroups," each illustratively capturing changes to one or more storage volume over time.

The snapshot grouping logic 114 is also configured to control performance of a snapshot group merge process for multiple ones of the storage volumes 110. For example, the snapshot group merge process in some embodiments is illustratively configured to merge multiple otherwise unrelated ones of the storage volumes into a single snapgroup in a manner that avoids duplication of metadata operations and conserves storage resources.

A given set of storage volumes designated for participation in the snapshot group merge process illustratively comprises a set of LUNs or other instances of the storage volumes 110 of the storage system 102. Each such LUN or other storage volume illustratively comprises at least a portion of a physical storage space of one or more of the storage devices 106. The term "storage volume" as used herein is intended to be broadly construed, and should not be viewed as being limited to any particular format or configuration.

The snapshot groups are illustratively represented by respective snapshot trees in the storage system 102. A given one of the snapshot trees more particularly comprises a root node, at least one branch node, and a plurality of leaf nodes, with a given one of the branch nodes representing a particular version of a storage volume from which a corresponding snapshot is taken. A first one of the leaf nodes which is a child of the given branch node represents a subsequent version of the storage volume, and a second one of the leaf nodes which is a child of the given branch node comprises the corresponding snapshot providing a PIT copy of the particular version of the storage volume.

Illustrative examples of snapshot trees of the type described above are shown in FIGS. 3A and 3B, and will be described in greater detail below in conjunction with the flow diagrams of FIGS. 2A, 2B and 2C. The flow diagrams show an example process for merging multiple otherwise unrelated storage volumes into a single snapshot group.

In some embodiments, the snapshot trees comprise or are otherwise associated with additional information also arranged in the form of a tree structure. For example, a given one of the snapshot trees may comprise or be otherwise associated with one or more additional trees including at least one of a "dirty" tree that characterizes updates to logical addresses of the corresponding storage volume, and a hash tree comprising content-based signatures of respective ones of the logical addresses of the corresponding storage volume. All nodes of a given snapshot tree in some embodiments, including both branch nodes and leaf nodes, may each be associated with corresponding metadata of both a dirty tree and a hash tree. The term "snapshot tree" as used herein is intended to be broadly construed so as to encompass such dirty trees and hash trees, or other tree-like data structures that incorporate similar information characterizing changes to a storage volume over time.

An instance of a differential scan performed for the given snapshot tree in embodiments of this type can further comprise aggregating information of at least one of the dirty tree and the hash tree between start and stop nodes of the given snapshot tree. The start and stop nodes are examples of what are more generally referred to herein as first and second nodes corresponding to respective current and previous snapshots. Start and stop nodes can comprise branch nodes or leaf nodes associated with those branch nodes. Also, a given one of the first and second nodes can comprise a leaf node rather than a branch node. Terms such as "start node," "stop node," "first node" and "second node" are therefore intended to be broadly construed, and should not be viewed as being restricted to either branch nodes or leaf nodes.

A wide variety of other types of snapshot trees and possibly one or more associated additional trees can be used in other embodiments. Also, the term "tree" as used herein is intended to be broadly construed so as to comprise any type of data structure characterizing a plurality of nodes and a plurality of edges interconnecting respective pairs of the nodes.

Terms such as "snapshot group" and "snapgroup" as used herein are also intended to be broadly construed, so as to encompass, for example, various types and arrangements of sets of related snapshots.

In accordance with the snapgroup merge functionality, the storage controller 108 is configured to identify a first storage volume of a first snapshot group of the storage system 102, to identify a second storage volume that is not part of the first snapshot group of the storage system 102 but contains at least a threshold amount of matching data relative to the first storage volume, and to merge the second storage volume into the first snapshot group. Such operations are illustratively performed by or otherwise under the control of the snapshot grouping logic 114 of the storage controller 108.

The term "matching data" as used herein is intended to be broadly construed, and is illustratively determined in some embodiments using hash handles, hash digests or other types of content-based signatures of respective data pages. For example, a match between hash handles of respective data pages at a given logical address in the first and second storage volumes can be used as an indication that the two data pages comprise "matching data" relative to one another. Other indications of matching data between storage volumes can be used in other embodiments. Moreover, matching data can be determined in some cases by comparing a second storage volume to a snapshot of the first storage volume, or comparing a first storage volume to a snapshot of the second storage volume. Such arrangements are considered to be within the recitation of "matching data relative to the first storage volume" as used herein.

The first snapshot group in some embodiments is in the form of a first snapshot tree having a first root node, and the second storage volume prior to its merger into the first snapshot group is part of a second snapshot group in the form of a second snapshot tree having a second root node different than the first root node.

Figure 3A:
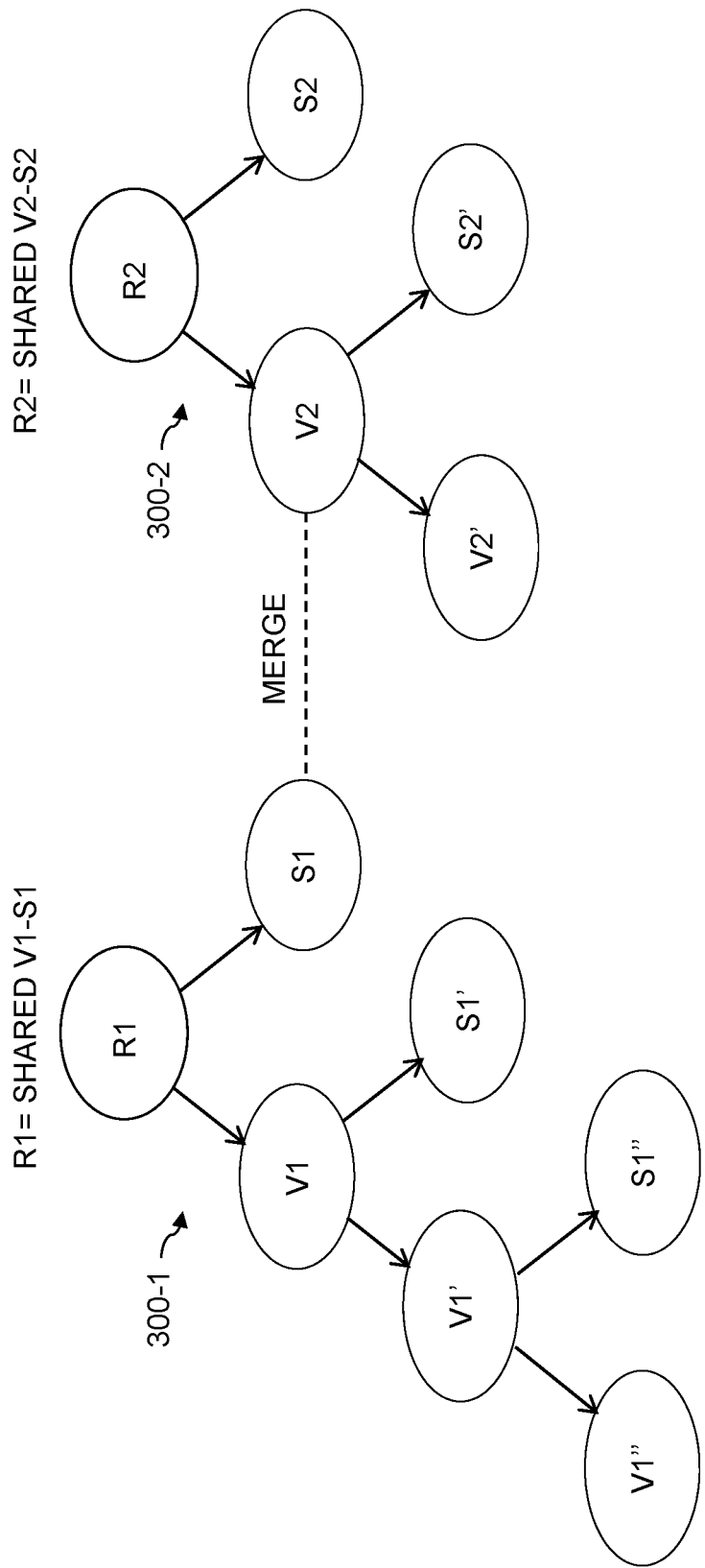
FIGS. 3A and 3B show example snapshot trees utilized in merging multiple storage volumes into a single snapgroup in an illustrative embodiment.
Figure 3B:
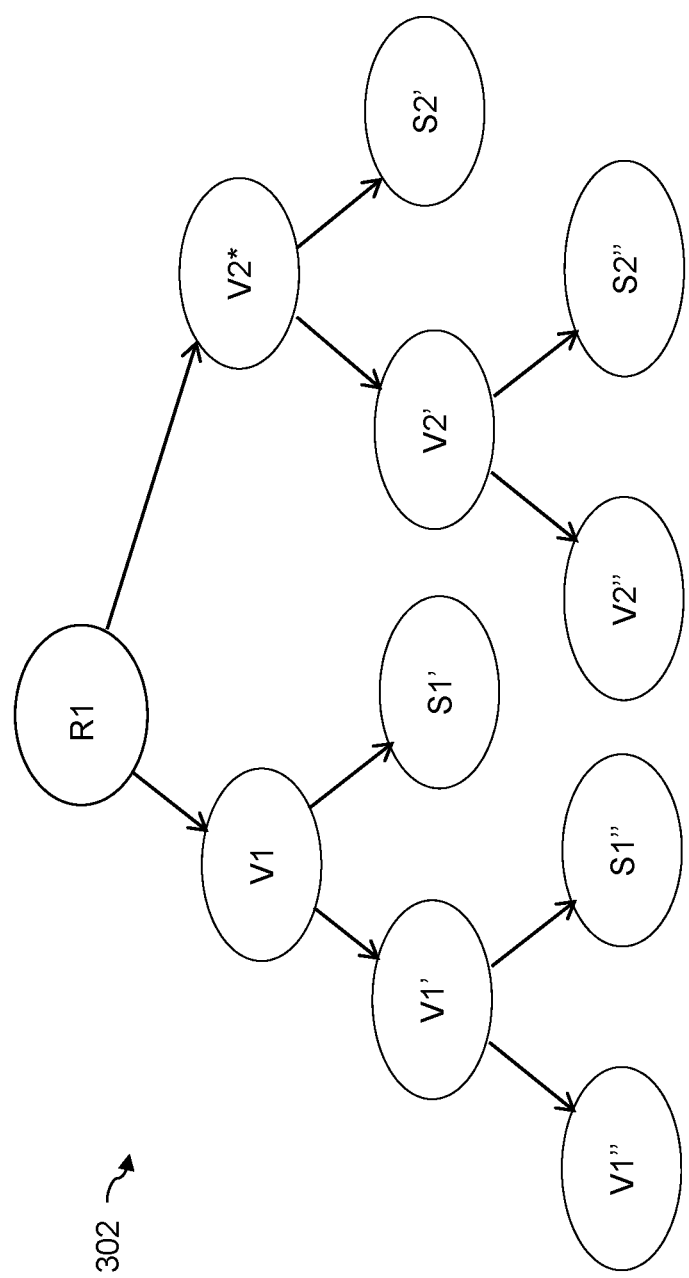

An example of such an arrangement can be seen in FIGS. 3A and 3B, with storage volumes V1 and V2 denoting the respective first and second storage volumes and R1 and R2 denoting the respective root nodes in that example.

The storage controller 108 is illustratively configured to identify the second storage volume that is not part of the first snapshot group of the storage system 102 but contains at least a threshold amount of matching data relative to the first storage volume by comparing a portion of each of a plurality of storage volumes to a corresponding portion of the first storage volume to determine amounts of matching data relative to the first storage volume, and to identify the second storage volume from among the plurality of storage volumes based at least in part on results of the comparison.

The plurality of storage volumes illustratively comprises at least a subset of the storage volumes 110 of the storage system 102.

As mentioned previously, the storage system 102 in some embodiments comprises a content addressable storage system. In such a system, logical addresses of data pages are mapped to physical addresses of the data pages using respective content-based signatures that are generated from those data pages.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the data page from which it is generated, such that two data pages with exactly the same content will have the same hash digest, while two data pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In some embodiments, various types of address metadata are utilized to provide content addressable storage functionality in storage system 102. The address metadata in some embodiments comprises at least a portion of one or more logical layer mapping tables that map logical addresses of respective ones of the data pages of a storage volume to corresponding content-based signatures of the respective data pages.

Examples of logical layer mapping tables and other metadata structures maintained by the storage controller 108 of storage system 102 are described below. It is to be appreciated that these particular tables are only examples, and other tables or metadata structures having different configurations of entries and fields can be used in other embodiments.

The logical layer and physical layer mapping tables in some embodiments illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments.

In an embodiment in which storage system 102 comprises a content based storage system, comparing a portion of each of a plurality of storage volumes to a corresponding portion of the first storage volume to determine amounts of matching data relative to the first storage volume illustratively comprises comparing content-based signatures of respective designated data pages of each of the plurality of storage volumes to content-based signatures of respective designated data pages of the first storage volume. The portions of the storage volumes that are compared illustratively comprise respective slices of the storage volumes. As noted above, the content-based signatures can comprise respective hash handles of the designated data pages and/or respective hash digests of the designated data pages.

The amounts of matching data for respective ones of the plurality of storage volumes can be determined as numbers of data pages having content-based signatures that match content-based signatures of the corresponding data pages of the first storage volume.

In some embodiments, comparing a portion of each of a plurality of storage volumes to a corresponding portion of the first storage volume to determine amounts of matching data relative to the first storage volume comprises performing a first level comparison using a relatively small sample of data pages of the plurality of storage volumes, and for any of the plurality of storage volumes found to satisfy the first level comparison, performing a second level comparison using a relatively large sample of data pages of those storage volumes. Such comparisons illustratively use hash handles, hash digests or other content-based signatures of respective ones of the data pages.

Identifying the second storage volume from among the plurality of storage volumes based at least in part on results of the comparing illustratively comprises identifying the second storage volume as a particular one of the plurality of storage volumes exhibiting a highest amount of matching data among the plurality of storage volumes.

The above-described identification of the second storage volume can be viewed as identifying a particular one of the plurality of storage volume that is unrelated to the first storage volume but nonetheless includes data that is very similar to that of the first storage volume. For example, copying or cloning of storage volumes in the storage system 102 can lead to such situations. Maintaining entirely separate snapgroups for such storage volumes in the storage system 102 can be highly wasteful of storage resources. Illustrative embodiments herein avoid such drawbacks by facilitating the identification and combination of storage volumes that contain similar data, thereby avoiding duplication of metadata operations and conserving storage resources.

In some embodiments, the identification of the second storage volume to be merged into the first snapshot group of the first storage volume comprises sampling multiple different merge options, computing an estimated amount of savings for each of the different merge options, and then selecting as the second storage volume the particular storage volume that provides the maximum estimated savings. Although it is possible to do this in a deterministic way by comparing all data of each of the plurality of storage volumes to that of the first storage volume, such an approach would be unduly expensive. Illustrative embodiments overcome these and other drawbacks by providing highly efficient techniques for identifying the second storage volume without the excessive computational and storage costs associated with a deterministic identification approach.

As an example of identification of a storage volume for merger into a snapgroup as disclosed herein, an illustrative embodiment samples only a designated portion of the metadata (e.g., a slice representing $1/1024$ of each storage volume) in making the comparison of storage volumes. As a more particular example, multiple distinct sampling rounds at respective different granularity levels can be performed to identify one or more storage volumes exhibiting at least a threshold amount of matching data relative to another storage volume. For example, similar storage volumes can initially be clustered at a first level of granularity using a relatively small sample of data pages (e.g., $1/10000000$ of each storage volume). This is followed by further comparison, for only those storage volumes in the best matching cluster(s) of the first level, at a second level of granularity using a relatively large sample of data pages (e.g., the above-noted slice representing $1/1024$ of each storage volume). Other numbers and arrangements of different levels of comparisons can be used.

The above-described identification of a second storage volume to be merged into a snapgroup of a first storage volume illustratively involves sampling a relatively small number of hash handles from each of the plurality of potential merge candidates. If a candidate with a sufficiently high similarity to the first storage volume is found in an initial level of comparison, that candidate can be merged into the snapgroup, as described in more detail below. Otherwise the next level of comparison is performed, using a larger sample of hash handles but applied only to a subset of the candidates identified in the previous level of comparison, and if necessary this comparison can be performed for one or more additional levels with candidate subsets of decreasing size until an appropriate candidate is identified.

In some embodiments, root nodes of respective snapshot trees of the candidate storage volumes are scanned and compared to leaf nodes of the first snapshot group that includes the first snapshot volume, in order to identify the most appropriate candidate storage volume for merger into the first snapshot group.

Such identification arrangements can be used to allow storage administrators and other system users to estimate the benefits that can be achieved from merging storage volumes into existing snapgroups. Illustrative embodiments therefore include estimation tools that are deployed within or in conjunction with the storage system 102 in order to periodically or under other conditions generate such estimates.

Merging the second storage volume into the first snapshot group illustratively comprises generating respective first and second snapshots of the respective first and second storage volumes, and for each of a plurality of data pages of the second snapshot, comparing a content-based signature of that data page to a content-based signature of a corresponding data page of the first snapshot, and for any mismatched data page, modifying the data page of the first snapshot to match the data page of the second snapshot. The second storage volume and the first snapshot are then merged such that the second storage volume corresponds to a snapshot of the first storage volume in the first snapshot group. At this point, the second snapshot and a previous root node of the second storage volume can be deleted.

In some embodiments, an example snapshot group merge process more particularly operates as follows. Assume that the identification process described above has identified a second storage volume V2 to be joined with a first storage volume V1 into a single snapgroup, with both V1 and V2 being active volumes and with V2 to be made a snapshot of V1 as a result of the snapshot group merge process. The example snapshot group merge process in this example then includes the following steps:

1. Snap V1 and V2 into S1 and S2 respectively and then continue writes to V1 and V2. V1 and S1 have a shared root R1, and V2 and S2 have a shared root R2, as illustrated in FIG. 3A. Snapping V1 into S1 illustratively involves freezing the data in root node R1 which represents a shared V1-S1 node and creating two children V1 and S1 of R1, with S1 being the snapshot. Similarly, snapping V2 into S2 illustratively involves freezing the data in root node R2 which represents a shared V2-S2 node and creating two children V2 and S2 of R2, with S2 being the snapshot.

2. Perform a different scan ("snapdiff") between S2 and an empty root. Note that S2 is the same as R2, since S2 is a snapshot and nothing is overwritten in S2. For every hash handle entry in S2, if the entry is the same as the corresponding entry in S1, do not make any change to the entry in S1, and otherwise change the entry in S1 such that it matches the entry in S2. At the completion of this portion of the process, S1 will be exactly the same as S2 and R2 in terms of user data.

3. At this point V2 includes all changes made as a result of the continued writes. Since R2 is now identical to S1, change the parent node of V2 to S1 instead of R2.

4. Delete R2 and S2.

5. Merge V2 and S1 in the background to form merged node V2*. The resulting snapshot tree is shown in FIG. 3B.

The above example process efficiently joins two existing active volumes V1 and V2 into a single snapgroup.

Additional or alternative steps may be used in the snapshot group merge process in other embodiments. Also, the ordering of the steps can be varied, and two or more of the steps can be performed at least in part in parallel with each other. Other examples are described below in conjunction with the flow diagrams of FIGS. 2A, 2B and 2C.

The above-described operations carried out in conjunction with a process for merging multiple otherwise unrelated storage volumes into a single snapgroup in the storage system 102 are illustratively performed at least in part by or otherwise under the control of snapshot grouping logic 114 of the storage controller 108.

The storage system 102 in the FIG. 1 embodiment is assumed to be implemented using at least one processing platform each comprising one or more processing devices each having a processor coupled to a memory. Such processing devices can illustratively include particular arrangements of compute, storage and network resources.

At least portions of the associated host devices 101 may be implemented on the same processing platform as the storage system 102 or on separate processing platforms.

The term "processing platform" as used herein is intended to be broadly construed so as to encompass, by way of illustration and without limitation, multiple sets of processing devices that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices 101 and the storage system 102 are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 106, storage controller 108 and storage volumes 110 can be used in other embodiments.

For example, the storage system 102 can be configured as a clustered storage system comprising a plurality of storage nodes each comprising a set of processing modules configured to communicate with corresponding sets of processing modules on other ones of the storage nodes. The sets of processing modules of the storage nodes of the storage system 102 in an embodiment of this type collectively comprise at least a portion of the storage controller 108 of the storage system 102.

It should therefore be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, snapshot group merge functionality as disclosed herein can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagrams of the illustrative embodiments of FIGS. 2A, 2B and 2C, which collectively implement a process for merging multiple storage volumes into a single snapgroup. The process is suitable for use in system 100 but is more generally applicable to a wide variety of other types of information processing systems comprising at least one storage system.

Figure 2B:
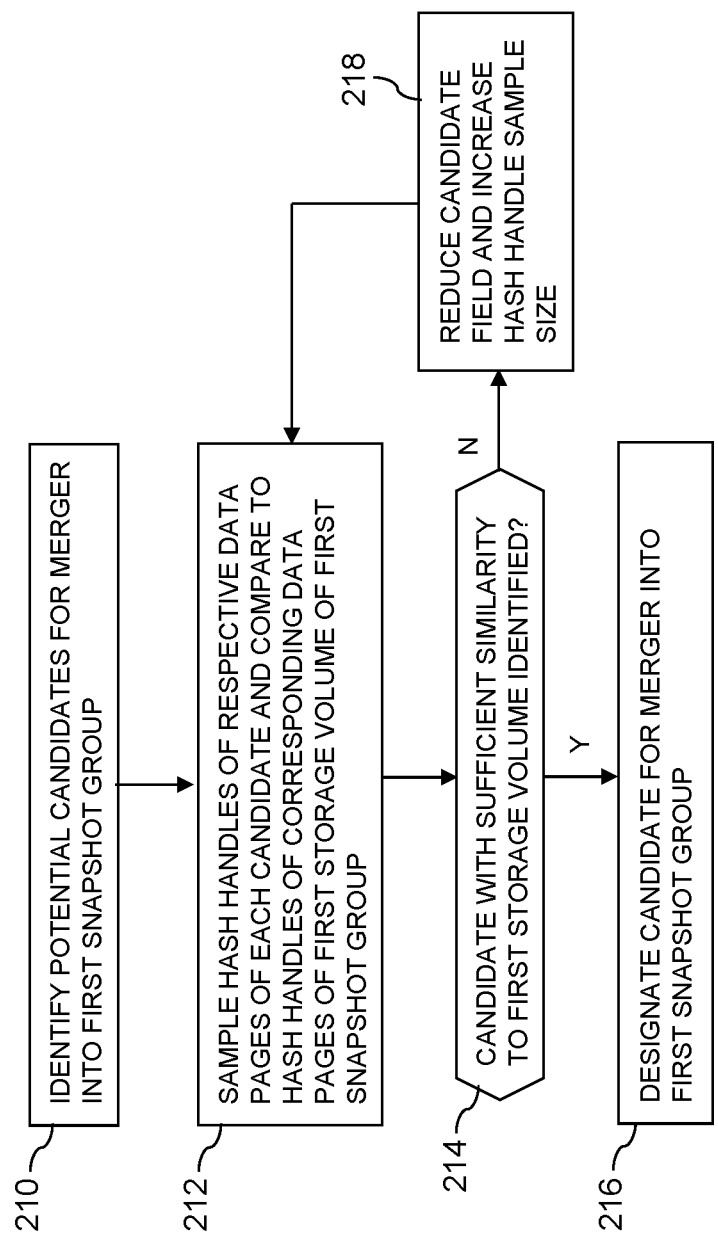

The flow diagram of FIG. 2A provides a general overview of an example snapshot group merge process in which storage volumes suitable for merging are identified and then merged into a single snapgroup. The flow diagram of FIG. 2B shows additional details of the storage volume identification portion of the process, and the flow diagram of FIG. 2C shows additional details of the merging portion of the process. In describing these flow diagrams, reference will also be made to the example snapshot trees of FIGS. 3A and 3B.

Referring now to FIG. 2A, the snapshot group merge process as illustrated includes steps 200, 202 and 204.

In step 200, a first storage volume of a first snapshot group is identified. The identified first storage volume illustratively comprises a particular one of the storage volumes 110 of the storage system 102. By way of example, the first storage volume in the FIG. 3A embodiment is denoted as storage volume V1. Storage volume V1 is part of a first snapshot group represented by a first snapshot tree 300-1.

In step 202, a second storage volume is identified that is not part of the first snapshot group but contains at least a threshold amount of matching data relative to the first storage volume. The second storage volume in the FIG. 3A embodiment is denoted as storage volume V2. Storage volume V2 is part of a second snapshot group represented by a second snapshot tree 300-2. The threshold illustratively specifies a minimum amount of matching data that must be present between the first and second storage volumes, determined based at least in part on sampling of those storage volumes as described elsewhere herein, in order for the second storage volume to be merged into the first snapshot group that includes the first storage volume. Other types of thresholds can be used in other embodiments, and the term "threshold" herein is therefore intended to be broadly construed.

In step 204, the second storage volume is merged into the first snapshot group. With reference again to the embodiment of FIG. 3A, that figure shows the pre-merge arrangement, with otherwise unrelated storage volumes V1 and V2 in separate snapshot trees 300-1 and 300-2, and FIG. 3B shows the corresponding post-merge arrangement, with V1 and V2 merged into the same snapshot tree 302.

Referring now to FIG. 2B, a storage volume identification portion of the snapshot group merge process as illustrated includes steps 210 through 218.

In step 210, potential candidates for merger into the first snapshot group that includes the first storage volume are identified. For example, the potential candidates can include any of the storage volumes 110 other than the first storage volume that is already part of the first snapshot group, or subsets of those storage volumes.

In step 212, hash handles of respective data pages are sampled and compared to hash handles of the corresponding data pages of the first storage volume of the first snapshot group. In an initial pass through step 212, the sampling of the hash handles is performed using a relatively small sample size, as there is a relatively large number of potential candidates in this initial pass. As indicated elsewhere herein, these and other comparisons can be performed using snapshots of respective storage volumes instead of the actual storage volumes.

In step 214, a determination is made as to whether or not a particular candidate exhibiting sufficient similarity to the first storage volume has been identified. In some embodiments, sufficient similarity is indicated by the particular candidate exhibiting at least a threshold amount of matching data relative to the first storage volume based on comparison using the sampled hash handles. If such a candidate has been identified, the process moves to step 216, and otherwise moves to step 218 as indicated. The determination can be based on comparison of snapshots of candidate storage volumes to the first storage volume, or comparisons of candidate storage volumes to a snapshot of the first storage volume. Numerous other comparison arrangements can be used to determine if a candidate exhibits sufficient similarity to the first storage volume. The similarity can be measured in terms of total number of matching hash handle entries, or using other techniques. References herein to amounts of matching data "relative to" a first storage volume do not require direct comparison of a candidate storage volume to the first storage volume, but can instead involve comparisons that utilize one or more snapshots generated from one or more of those storage volumes. The term "relative to" in this context is therefore intended to be broadly construed.

In step 216, the identified candidate is designated for merger into the first snapshot group, and the storage volume identification portion of the process ends.

In step 218, the candidate field is reduced and the hash handle sample size is increased. The process then returns to step 212 to repeat the sampling and comparing operations using the reduced number of candidates and the increased sample size. For example, the candidate field may be reduced to a particular number of candidates that were found to be most similar to the first storage volume in the previous iteration of step 212. The sampling of the hash handles in the next iteration of step 212 is performed using a larger sample size than that used in the initial iteration, as there are fewer potential candidates at this point. Candidates failing to exhibit at least minimal similarity are eliminated from consideration.

One or more additional iterations of steps 212, 214 and 218 may be performed if necessary until an appropriate candidate is identified and the process moves to step 216 to designate that candidate for merger into the first snapshot group.

Figure 2C:
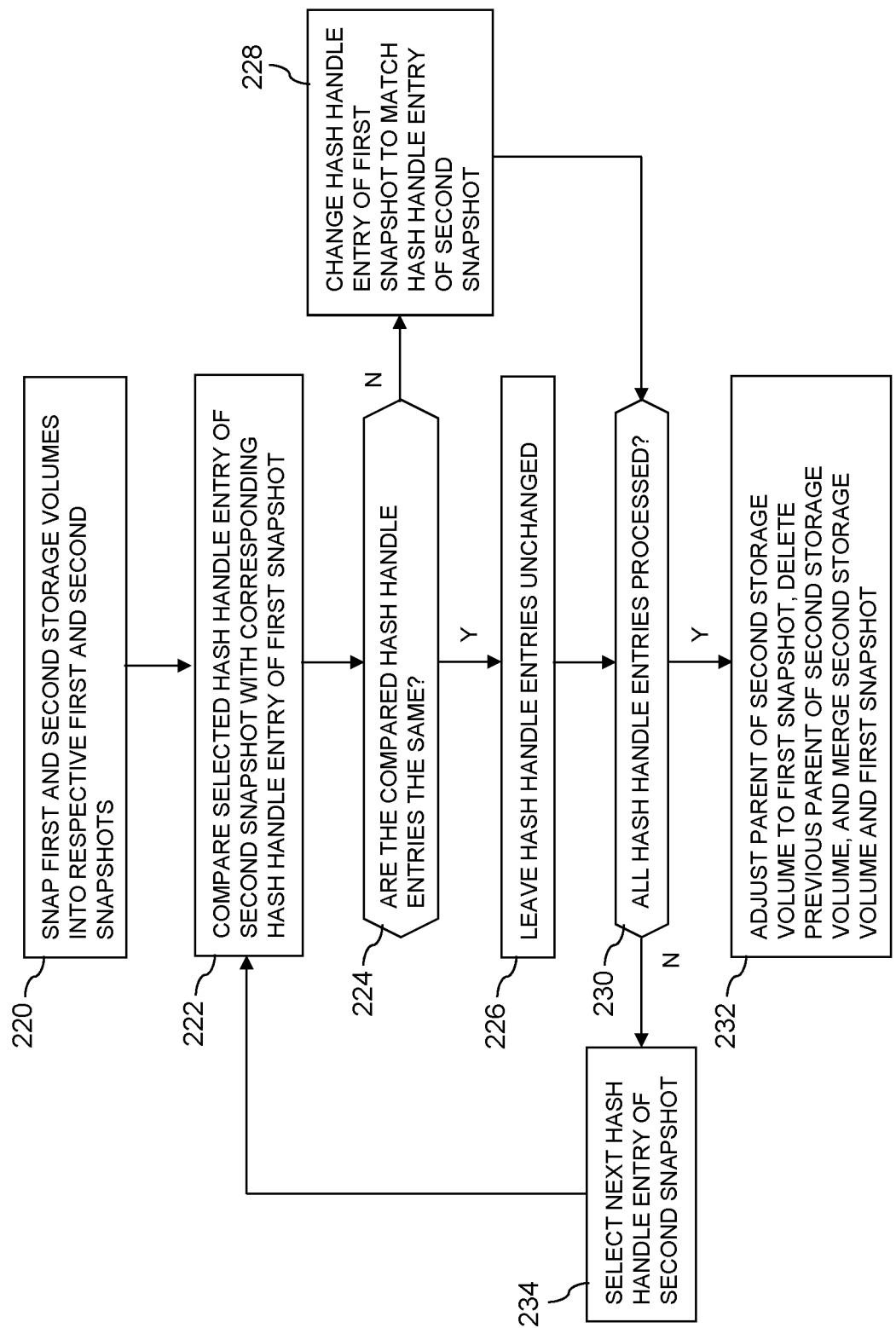

Referring now to FIG. 2C, a storage volume merge portion of the snapshot group merge process as illustrated includes steps 220 through 234. The particular candidate designated for merger into the first snapshot group in FIG. 2B is referred to as the second storage volume in FIGS. 2A and 2C. In the example of FIG. 3A, a second storage volume V2 has been designated for merger with a first storage volume V1 into a single snapshot group, with both V1 and V2 being active volumes and with V2 to be made a snapshot of V1 as a result of the snapshot group merge process.

In step 220, the first and second storage volumes are snapped into respective first and second snapshots, in the manner described elsewhere herein. For example, again with reference to FIG. 3A, first and second storage volumes V1 and V2 in respective first and second snapshot trees 300-1 and 300-2 are snapped into respective snapshots S1 and S2, and then writes to V1 and V2 continue as V1 and V2 are active volumes.

In step 222, an initial hash handle entry of the second snapshot is selected, and compared with the corresponding hash handle entry of the first snapshot.

In step 224, a determination is made as to whether or not the compared hash handle entries are the same. If the compared hash handle entries are the same, the process moves to step 226, and otherwise moves to 228.

In step 226, the hash handle entries determined to be the same in step 224 are left unchanged, and the process moves to step 230.

In step 228, the hash handle entry of the first snapshot is changed to match the hash handle entry of the second snapshot, and the process moves to step 230.

In step 230, a determination is made as to whether or not all of the hash handle entries have been processed. If there are no hash handle entries left to be processed, the process moves to step 232. If there is at least one hash handle entry remaining to be processed, the process moves to step 234.

In step 232, which is reached only after all hash handle entries of the second snapshot have been processed, the parent of the second storage volume is adjusted to the first snapshot, and the previous parent of the second storage volume is deleted. The second storage volume and the first snapshot are then merged, illustratively using a background process.

The particular processing operations and other system functionality described in conjunction with the flow diagrams of FIGS. 2A, 2B and 2C are presented by way of illustrative example only, and should not be construed as limiting the scope of the disclosure in any way. Alternative embodiments can use other types of processing operations for implementing snapshot group merge functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different snapshot group merge processes for respective different sets of storage volumes or for different storage systems or portions thereof within a given information processing system.

Functionality such as that described in conjunction with the flow diagrams of FIGS. 2A, 2B and 2C can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controller 108 of storage system 102 that are configured to control performance of one or more steps of the snapshot group merge process of FIGS. 2A, 2B and 2C in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 108 of storage system 102, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

Various aspects of one possible implementation of the snapshot group merge process of FIGS. 2A, 2B and 2C have been previously described with reference to snapshot tree illustrations of FIGS. 3A through 3B.

For example, as indicated above, the arrangement illustrated in FIG. 3A illustrates two snapshot trees 300-1 and 300-2 associated with respective storage volumes V1 and V2. The two snapshot trees 300-1 and 300-2 are representations of the respective snapshot groups of V1 and V2. It is assumed that V2 has been identified as an appropriate candidate for merging into the snapshot group of V1. V1 and V2 are snapped from their respective root nodes R1 and R2 to generate snapshots S1 and S2. The root nodes R1 and R2 represent respective shared nodes V1-S1 and V2-S2 of the respective snapshot trees 300-1 and 300-2. V1 and V2 are active volumes, so writes from host devices 101 continue to those volumes, and additional snapshots are periodically taken, illustratively resulting in additional nodes V1', S1', V1" and S1" related to V1 and additional nodes V2' and S2' related to V2.

A given storage volume snapshot tree 300-1 or 300-2 having a format of the type shown in FIG. 3A represents a corresponding storage volume and its snapshots over time. Each leaf node of the given snapshot tree represents a particular version of the storage volume or a snapshot of the storage volume, and each branch node represents a shared ancestor between a version of the storage volume, a snapshot of the storage volume, or a child branch node. When a given snapshot of the storage volume is created, two child leaf nodes are created, one representing new updates to the storage volume after creation of the snapshot, and the other representing the snapshot. The volume node from which the snapshot was created therefore becomes a branch node in the snapshot tree.

In accordance with the merge process as previously described in conjunction with FIG. 2C, the snapshot S1 is adjusted such that its entries match those of the snapshot S2, and then S1 is made the parent of V2, R2 and S2 are deleted, and V2 is merged with S1 to create the merged node identified as V2* in FIG. 3B. As a result of the merge process, the two separate snapshot trees 300-1 and 300-2 of FIG. 3A are merged into a single snapshot tree 302 as shown in FIG. 3B. A subsequent snapshot of V2' is generated, resulting in additional nodes denoted V2" and S2" in the figure. Other snapshots can be periodically generated and will result in additional nodes related to V1 or V2*.

It is to be appreciated that the snapshot tree arrangements of FIGS. 3A and 3B are presented by way of illustrative example only, and should not be construed as limiting in any way. Terms such as "root node" and "non-root node," "start node" and "stop node," and "first node" and "second node" as used herein are all intended to be broadly construed. A non-root node is considered to be any snapshot tree node that is not a root node. Start node and stop node designations for a given snapshot tree in some embodiments can be reversed relative to the designation arrangements referred to above in conjunction with the examples herein. Accordingly, such terms should not be construed as requiring a particular directionality for scanning the snapshot tree. It should also be understood that a wide variety of other snapshot tree arrangements may be used.

As noted above, the storage system in some embodiments comprises a content addressable storage array or other type of content addressable storage system suitably modified to incorporate snapgroup merge functionality as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 102, and accordingly is assumed to be coupled to one or more host devices of a computer system within information processing system 100.

Although it is assumed that the storage system 102 is a content addressable storage system in some embodiments, other types of storage systems can be used in other embodiments. For example, it is possible that the storage system 102 in an illustrative embodiment need not be a content addressable storage system and need not include an ability to generate snapshots and/or content-based signatures. In such an embodiment, the snapshot generator and snapshot grouping logic of the storage system can be implemented in a host device, possibly along with content-based signature generation functionality.

The storage controller 408 in the present embodiment is configured to implement snapgroup merge functionality of the type described elsewhere herein. For example, the content addressable storage system 405 illustratively implements a process for merging multiple otherwise unrelated storage volumes into a single snapgroup, such as the process illustrated in the flow diagrams of FIGS. 2A, 2B and 2C.

The storage controller 408 includes distributed modules 412 and 414, which are configured to operate in a manner similar to that described above for respective corresponding snapshot generator 112 and snapshot grouping logic 114 of the storage controller 108 of system 100. Module 412 is more particularly referred to as a distributed snapshot generator, and illustratively comprises multiple snapshot generator instances on respective ones of a plurality of distinct nodes, with the multiple snapshot generator instances collectively comprising the distributed snapshot generator 412. Module 414 more particularly comprises distributed snapshot grouping logic, and illustratively comprises multiple snapshot grouping logic instances on respective ones of the plurality of distinct nodes, with the multiple snapshot grouping logic instances collectively comprising the distributed snapshot grouping logic 414.

Figure 4:
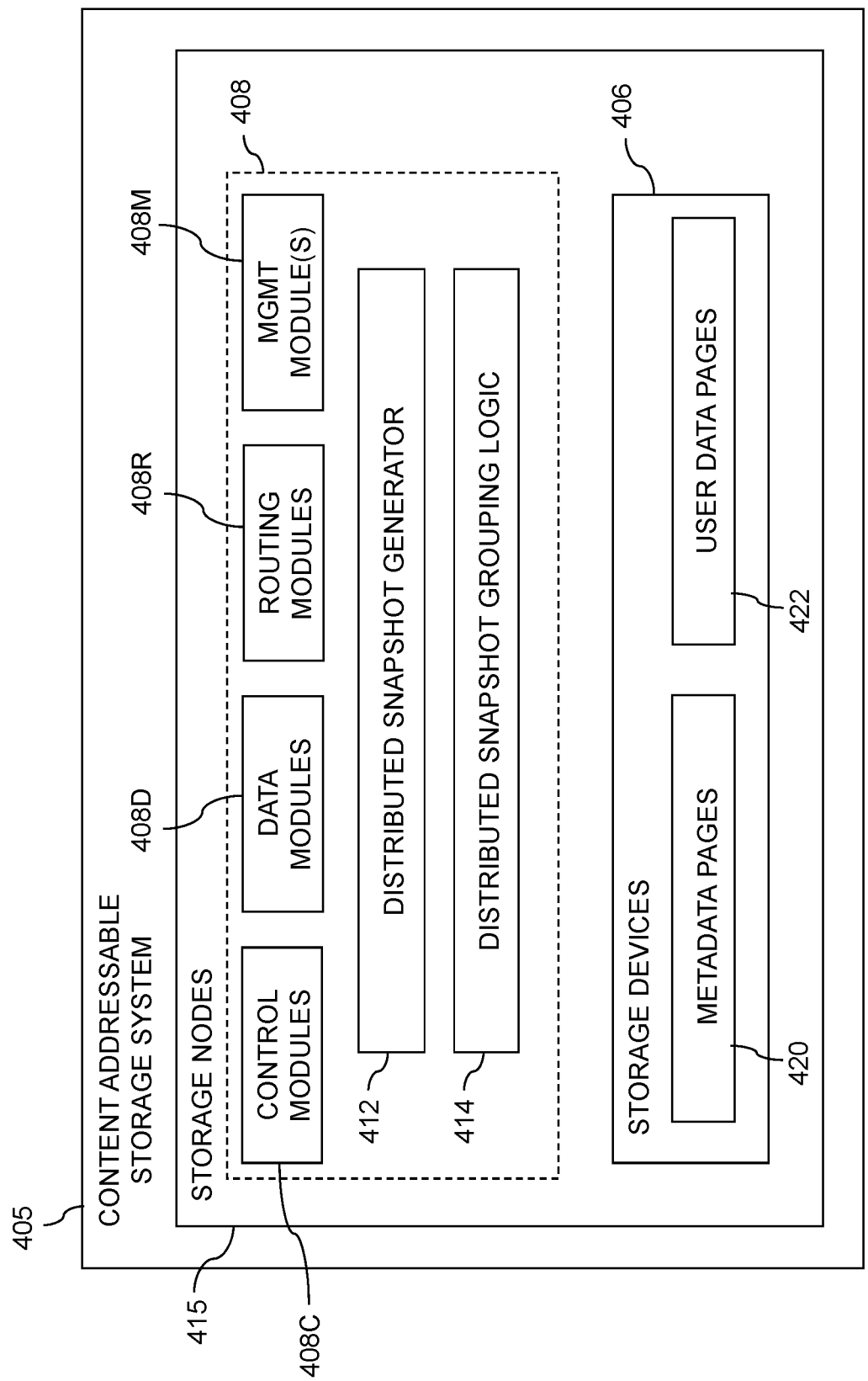
FIG. 4 illustrates a content addressable storage system comprising a distributed storage controller implementing snapgroup merge functionality in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 is referred to as distributed storage controller 408.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415. A given set of processing modules implemented on a particular one of the storage nodes 415 therefore illustratively includes at least one control module 408C, at least one data module 408D and at least one routing module 408R, and possibly a management module 408M.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the snapgroup merge functionality provided by the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, in a given set of n user data pages representing a portion of the user data pages 422, each of the user data pages is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The snapgroup merge functionality provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a snapshot grouping logic instance that engages corresponding snapshot grouping logic instances in all of the control modules 408C and routing modules 408R in order to implement a snapgroup merging process.

In some embodiments, the content addressable storage system 405 comprises an XtremIO™ storage array suitably modified to incorporate snapgroup merge functionality as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, snapgroup merge functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various 10 processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 405. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 406. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 405. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement snapgroup merge functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with snapgroup merge functionality as disclosed herein can provide a number of significant advantages relative to conventional arrangements.

For example, some of these embodiments advantageously provide techniques for merging multiple otherwise unrelated storage volumes into a single snapgroup in a manner that avoids duplication of metadata operations and conserves storage resources.

Such embodiments facilitate the identification and combination of storage volumes that contain similar data, thereby avoiding the need to maintain entirely separate snapgroups for such storage volumes.

Snapgroup merge functionality as disclosed herein can be implemented in at least one storage system, in at least one host device, or partially in one or more storage systems and partially in one or more host devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with snapgroup merge functionality will now be described in greater detail with reference to FIGS. 5 and 6. Although described in the context of system 100, these platforms may also be used to implement at least portions of other information processing systems in other embodiments.

Figure 5:
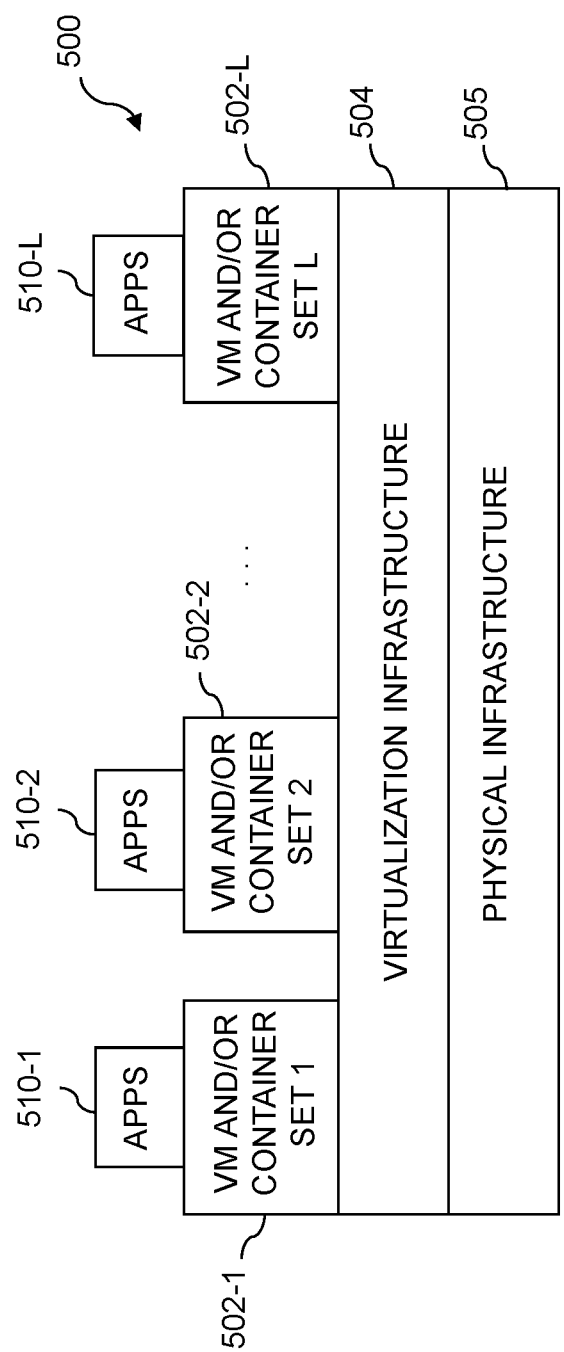
FIGS. 5 and 6 show examples of processing platforms that may be utilized to implement at least a portion of an information processing system in illustrative embodiments.
Figure 6:
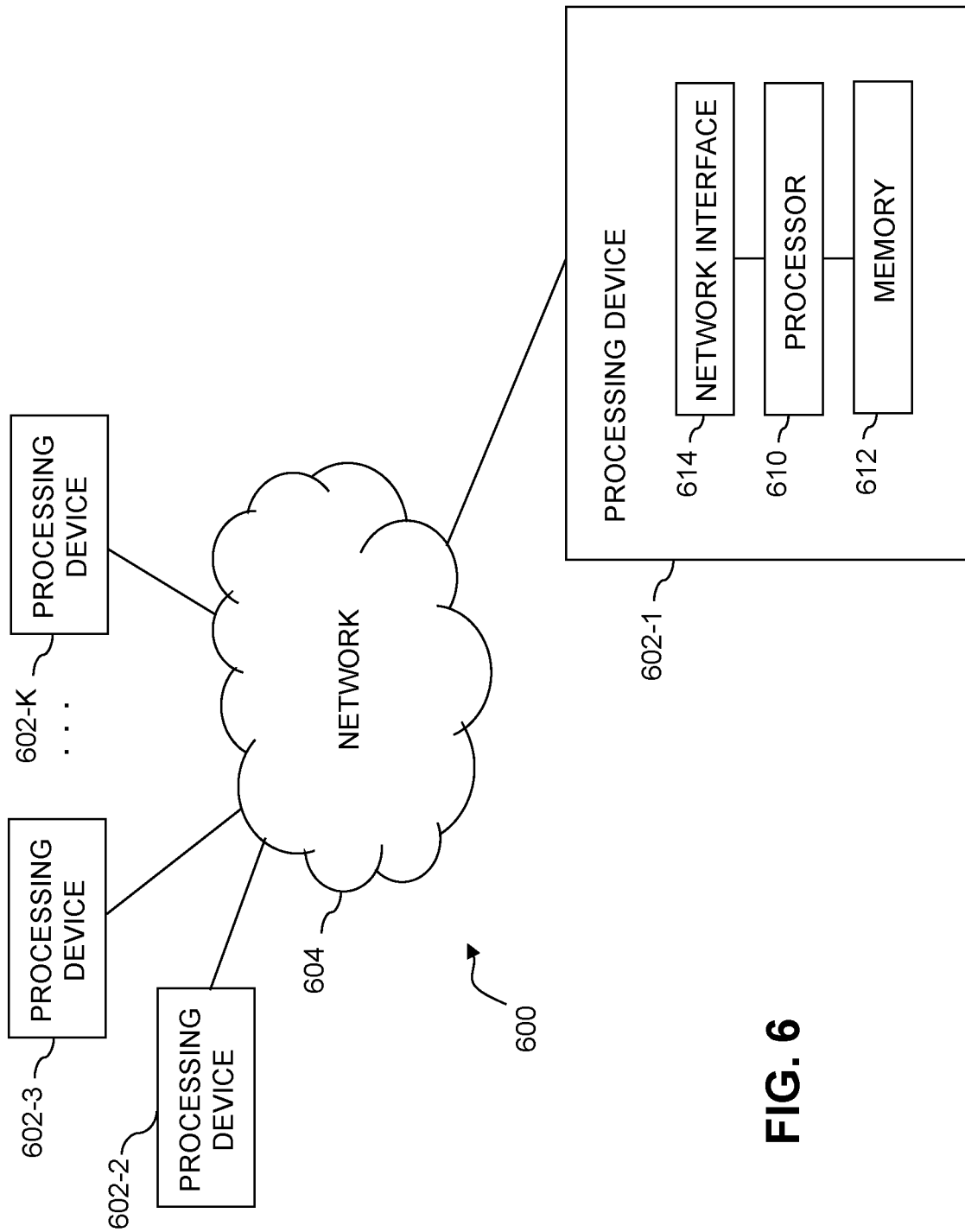

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide snapgroup merge functionality of the type described above for one or more processes running on a given one of the VMs. For example, each of the VMs can implement snapshot grouping logic instances and/or other components for supporting snapgroup merge functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide snapgroup merge functionality of the type described above. For example, a container host device supporting multiple containers of one or more container sets can implement one or more instances of snapshot grouping logic and/or other components for supporting snapgroup merge functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the snapgroup merge functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, snapshot generators, snapshot grouping logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to identify a first storage volume of a first snapshot group of a storage system;
   to identify a second storage volume that is not part of the first snapshot group of the storage system but contains at least a threshold amount of matching data relative to the first storage volume; and
   to merge the second storage volume into the first snapshot group.

2. The apparatus of claim 1 wherein said at least one processing device comprises a storage controller of the storage system.

3. The apparatus of claim 2 wherein the storage system comprises a plurality of storage nodes each comprising a set of processing modules configured to communicate with corresponding sets of processing modules on other ones of the storage nodes, the sets of processing modules of the storage nodes of the source storage system collectively comprising at least a portion of the storage controller of the storage system.

4. The apparatus of claim 1 wherein the first snapshot group is in the form of a first snapshot tree having a first root node.

5. The apparatus of claim 4 wherein the second storage volume prior to its merger into the first snapshot group is part of a second snapshot group in the form of a second snapshot tree having a second root node different than the first root node.

6. The apparatus of claim 1 wherein identifying a second storage volume that is not part of the first snapshot group of the storage system but contains at least a threshold amount of matching data relative to the first storage volume comprises:
   comparing a portion of each of a plurality of storage volumes to a corresponding portion of the first storage volume to determine amounts of matching data relative to the first storage volume; and
   identifying the second storage volume from among the plurality of storage volumes based at least in part on results of the comparing.

7. The apparatus of claim 6 wherein comparing a portion of each of a plurality of storage volumes to a corresponding portion of the first storage volume to determine amounts of matching data relative to the first storage volume comprises comparing content-based signatures of respective designated data pages of each of the plurality of storage volumes to content-based signatures of respective designated data pages of the first storage volume.

8. The apparatus of claim 7 wherein the content-based signatures comprise at least one of respective hash handles of the designated data pages and respective hash digests of the designated data pages.

9. The apparatus of claim 7 wherein the portions of the storage volumes comprise respective slices of the storage volumes.

10. The apparatus of claim 7 wherein the amounts of matching data for respective ones of the plurality of storage volumes are determined as numbers of data pages having content-based signatures that match content-based signatures of the corresponding data pages of the first storage volume.

11. The apparatus of claim 6 wherein comparing a portion of each of a plurality of storage volumes to a corresponding portion of the first storage volume to determine amounts of matching data relative to the first storage volume comprises:
performing a first level comparison using a first sample of data pages of the plurality of storage volumes; and
for any of the plurality of storage volumes found to satisfy the first level comparison, performing a second level comparison using a second sample of data pages of those storage volumes, wherein the second sample of data pages is larger than the first sample of data pages.

12. The apparatus of claim 6 wherein identifying the second storage volume from among the plurality of storage volumes based at least in part on results of the comparing comprises identifying the second storage volume as a particular one of the plurality of storage volumes exhibiting a highest amount of matching data among the plurality of storage volumes.

13. The apparatus of claim 1 wherein merging the second storage volume into the first snapshot group comprises:
generating respective first and second snapshots of the respective first and second storage volumes;
for each of a plurality of data pages of the second snapshot, comparing a content-based signature of that data page to a content-based signature of a corresponding data page of the first snapshot, and for any mismatched data page, modifying the data page of the first snapshot to match the data page of the second snapshot; and
merging the second storage volume and the first snapshot such that the second storage volume corresponds to a snapshot of the first storage volume in the first snapshot group.

14. The apparatus of claim 13 wherein merging the second storage volume into the first snapshot group further comprises deleting the second snapshot and a previous root node of the second storage volume.

15. A method comprising:
identifying a first storage volume of a first snapshot group of a storage system;
identifying a second storage volume that is not part of the first snapshot group of the storage system but contains at least a threshold amount of matching data relative to the first storage volume; and
merging the second storage volume into the first snapshot group;
wherein the method is implemented by at least one processing device comprising a processor coupled to a memory.

16. The method of claim 15 wherein identifying a second storage volume that is not part of the first snapshot group of the storage system but contains at least a threshold amount of matching data relative to the first storage volume comprises:
comparing a portion of each of a plurality of storage volumes to a corresponding portion of the first storage volume to determine amounts of matching data relative to the first storage volume; and
identifying the second storage volume from among the plurality of storage volumes based at least in part on results of the comparing.

17. The method of claim 15 wherein merging the second storage volume into the first snapshot group comprises:
generating respective first and second snapshots of the respective first and second storage volumes;
for each of a plurality of data pages of the second snapshot, comparing a content-based signature of that data page to a content-based signature of a corresponding data page of the first snapshot, and for any mismatched data page, modifying the data page of the first snapshot to match the data page of the second snapshot; and
merging the second storage volume and the first snapshot such that the second storage volume corresponds to a snapshot of the first storage volume in the first snapshot group.

18. A computer program product comprising a non-transitory processor-readable storage medium having stored therein program code of one or more software programs, wherein the program code when executed by at least one processing device causes said at least one processing device:
to identify a first storage volume of a first snapshot group of a storage system;
to identify a second storage volume that is not part of the first snapshot group of the storage system but contains at least a threshold amount of matching data relative to the first storage volume; and
to merge the second storage volume into the first snapshot group.

19. The computer program product of claim 18 wherein identifying a second storage volume that is not part of the first snapshot group of the storage system but contains at least a threshold amount of matching data relative to the first storage volume comprises:
comparing a portion of each of a plurality of storage volumes to a corresponding portion of the first storage volume to determine amounts of matching data relative to the first storage volume; and
identifying the second storage volume from among the plurality of storage volumes based at least in part on results of the comparing.

20. The computer program product of claim 18 wherein merging the second storage volume into the first snapshot group comprises:
generating respective first and second snapshots of the respective first and second storage volumes;
for each of a plurality of data pages of the second snapshot, comparing a content-based signature of that data page to a content-based signature of a corresponding data page of the first snapshot, and for any mismatched data page, modifying the data page of the first snapshot to match the data page of the second snapshot; and merging the second storage volume and the first snapshot such that the second storage volume corresponds to a snapshot of the first storage volume in the first snapshot group.

\* \* \* \* \*